(12) United States Patent
Johnson et al.

(10) Patent No.: US 8,325,444 B2
(45) Date of Patent: Dec. 4, 2012

(54) SLIDER WITH STABILIZING CONTACT FINGER

(75) Inventors: Michael Thomas Johnson, Minneapolis, MN (US); Adam Karl Himes, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 835 days.

(21) Appl. No.: 12/489,218

(22) Filed: Jun. 22, 2009

(65) Prior Publication Data

US 2010/0321827 A1    Dec. 23, 2010

(51) Int. Cl.
    *G11B 17/32*    (2006.01)
(52) U.S. Cl. ...................................... 360/235.4
(58) Field of Classification Search ................ 360/235.4
    See application file for complete search history.

(56) References Cited

U.S. PATENT DOCUMENTS

| | | | |
|---|---|---|---|
| 5,991,113 A | 11/1999 | Meyer et al. | |
| 5,991,120 A | 11/1999 | Sato | |
| 6,157,519 A | 12/2000 | Kohira et al. | |
| 6,160,683 A | 12/2000 | Boutaghou | |
| 6,661,605 B1 | 12/2003 | Pust et al. | |
| 6,714,382 B1 | 3/2004 | Alexopoulos et al. | |
| 6,762,909 B2 | 7/2004 | Albrecht et al. | |
| 6,914,752 B2 * | 7/2005 | Albrecht et al. | 360/246.1 |
| 6,920,019 B2 | 7/2005 | Martin et al. | |
| 7,064,930 B2 | 6/2006 | Serpe et al. | |
| 7,218,478 B2 | 5/2007 | Mate et al. | |
| 7,262,937 B2 | 8/2007 | Pendray et al. | |
| 2007/0253111 A1* | 11/2007 | Shimizu et al. | 360/235.4 |
| 2008/0100966 A1* | 5/2008 | Ozeki | 360/235.4 |
| 2008/0117550 A1* | 5/2008 | Zhang | 360/235.4 |
| 2008/0198510 A1 | 8/2008 | Sugimoto et al. | |
| 2009/0273860 A1* | 11/2009 | Ichihara | 360/235.4 |
| 2011/0069408 A1 | 3/2011 | Kurita et al. | |

OTHER PUBLICATIONS

Proceedings of the STLE/ASME International Joint Tribology Conference, IJTC2008, Oct. 20-22, 2008, pp. 1-3, Miami Florida, U.S.A.
Shengkai Yu, et al., Dynamics of Fly-Contact Head Disk Interface, IEEE Transactions on Magnetics, vol. 44, No. 11, Nov. 2008, pp. 3683-3686.

* cited by examiner

*Primary Examiner* — Mark Blouin
(74) *Attorney, Agent, or Firm* — Kagan Binder, PLLC (57) ABSTRACT

A slider includes a slider body having an air bearing surface, a first contact finger, and a transducing head. The first contact finger extends from the slider body and has a contact surface area of between about 2 square microns to about 20 square microns. The transducing head is supported by the slider body near the first contact finger and extends from the air bearing surface by a distance less than that of the first contact finger.

20 Claims, 6 Drawing Sheets

SLIDER WITH STABILIZING CONTACT FINGER

BACKGROUND

Hard disc drives (HDDs) typically comprise one or more discs, each disc typically having concentric data tracks or another configuration for storing data. Where multiple discs are used, a stack is formed of co-axial discs having generally the same diameter. A transducing head carried by a slider is used to read from and write to a data track on a disc. The slider is carried by a head arm assembly that includes an actuator arm and a suspension assembly, which can include a separate gimbal structure or can integrally form a gimbal. The actuator arm movably positions the slider with respect to the disc. As the disc is spun, the slider glides above the surface of the disc on a small cushion of air. As the slider is positioned closer to the disc, the fly height of the slider can become unstable. This instability can cause the distance between the transducing head and the disc to fluctuate, decreasing reading and writing performance. The instability can become so great that the transducing head can crash into the disc, damaging the transducing head.

SUMMARY

According to the present invention, a slider includes a slider body having an air bearing surface, a first contact finger, and a transducing head. The first contact finger extends from the slider body and has a contact surface area of between about 2 square microns (micrometers, μm) to about 20 square microns. The transducing head is supported by the slider body near the first contact finger and extends from the air bearing surface by a distance less than that of the first contact finger.

Another embodiment includes a method for operating a data storage device. The method includes the steps of flying a slider carrying a transducing head over a storage medium with a contact finger extending from the slider, having a contact surface area of between about 2 square microns to about 20 square microns, and positioned on the slider proximate the transducing head, pressing the contact finger against the storage medium so as to compress the contact finger and to provide substantially continuous contact between the contact finger and the storage medium, and performing a transducing operation with the transducing head spaced apart from the storage medium while the contact finger is compressed in substantially continuous contact with the storage medium.

DETAILED DESCRIPTION

Figure 1:
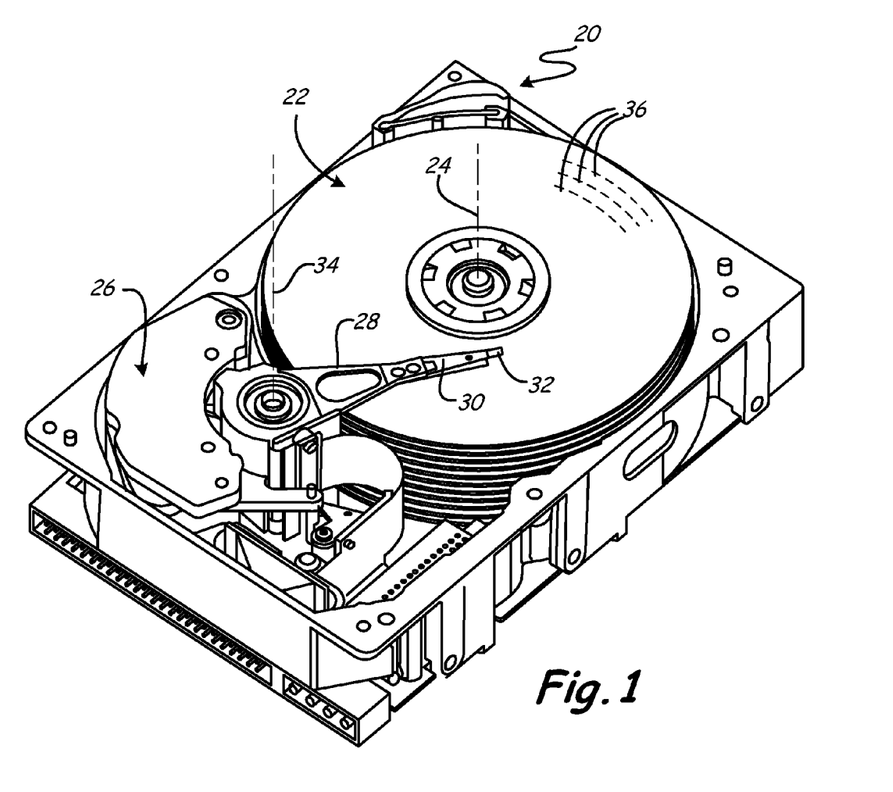
FIG. 1 is a perspective view of an exemplary hard disc drive HDD system.

FIG. 1 is a perspective view of an exemplary data storage device (hard disc drive (HDD) system 20) that includes a storage medium (magnetic storage disc 22) configured to rotate about axis 24, actuation motor 26 (e.g., a voice coil motor), actuator arm 28, suspension assembly 30, and slider 32 carrying a transducing head. Slider 32 is supported by suspension assembly 30, which in turn is supported by actuator arm 28. Actuation motor 26 is configured to pivot actuator arm 28 about axis 34, in order to sweep suspension 30 and slider 32 in an arc across a surface of rotating disc 22 with slider 32 "sliding" or "flying" across disc 22 on a cushion or air. The transducing head carried by slider 32 can be positioned relative to selected concentric data tracks 36 of disc 22, for reading from and writing to disc 22. It should be noted that a stack of co-rotating discs 22 can be provided, with additional actuator arms 28, suspension assemblies 30, and sliders 32 carrying transducing heads for reading and writing at top and bottom surfaces of each disc 22 in the stack.

Figure 2A:
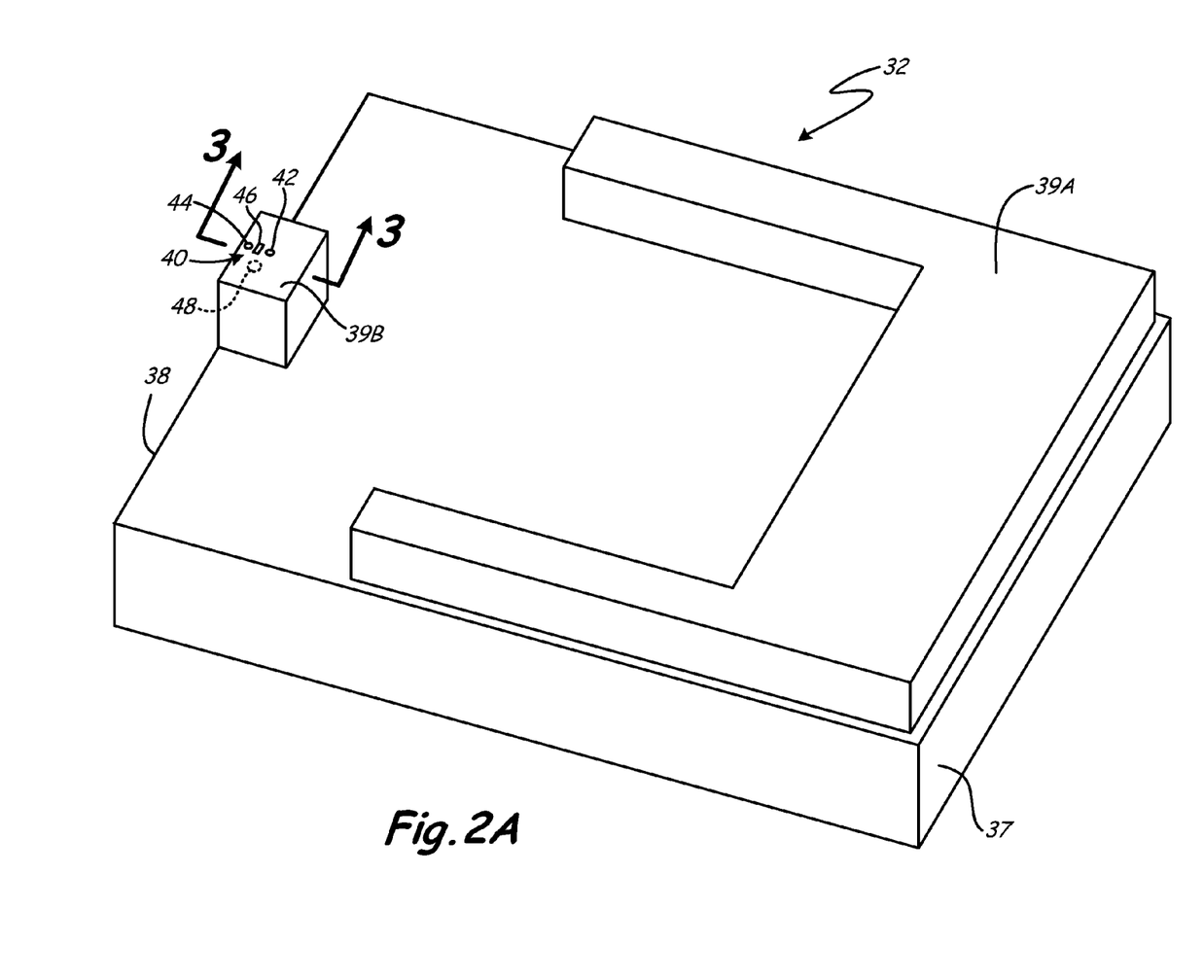
FIG. 2A is a perspective view of a slider with a contact finger.

FIG. 2A is a perspective view of slider 32. Slider 32 has leading edge 37, trailing edge 38, and air bearing surfaces 39A and 39B. Transducing head 40 (including reader 42 and writer 44) is positioned at air bearing surface 39B near trailing edge 38. Contact finger 46 is positioned on air bearing surface 39B, between reader 42 and writer 44. Heater 48 is positioned in an interior layer of slider 32, near transducing head 40. In the illustrated embodiment, slider 32 is a positive pitch slider, with trailing edge 38 tilted toward disc 22 (shown in FIG. 1). In an alternative embodiment, slider 42 could be a negative pitch slider, with transducing head 40 being positioned near leading edge 37, which would then be tilted toward disc 22.

As slider 32 flies over disc 22 (shown in FIG. 1), the air between air bearing surfaces 39A and 39B and disc forms an "air bearing". The shape of air bearing surfaces 39A and 39B are configured to position transducing head 40 close to, but not touching, disc 22. Contact finger 46 extends from air bearing surface 39B by a distance greater than that of transducing head 40. When contact finger 46 contacts disc 22, transducing head 40 is spaced apart from disc 22 to protect transducing head 40. Air bearing surfaces 39A and 39B are also spaced apart from disc 22 when contact finger 46 is in contact. Therefore, air bearing surfaces 39A and 39B can fly over disc 22 at the same time that contact finger 46 is in substantially continuous contact with disc 22 as it spins.

In the illustrated embodiment, heater 48 is positioned near transducing head 40 and contact finger 46. When heater 48 is activated, it can heat transducing head 40, contact finger 46, and surrounding material in slider 32, causing expansion in a direction toward disc 22 (shown in FIG. 1). Heater 48 can therefore be used to position contact finger 46 in substantially continuous contact with disc 22 and to position transducing head 40 near disc 22 at a distance configured to read and write data. In another embodiment, heater 48 can be replaced with another suitable micro-actuating device. In yet another embodiment, slider 32 can operate without a micro-actuating device.

Figure 2B:
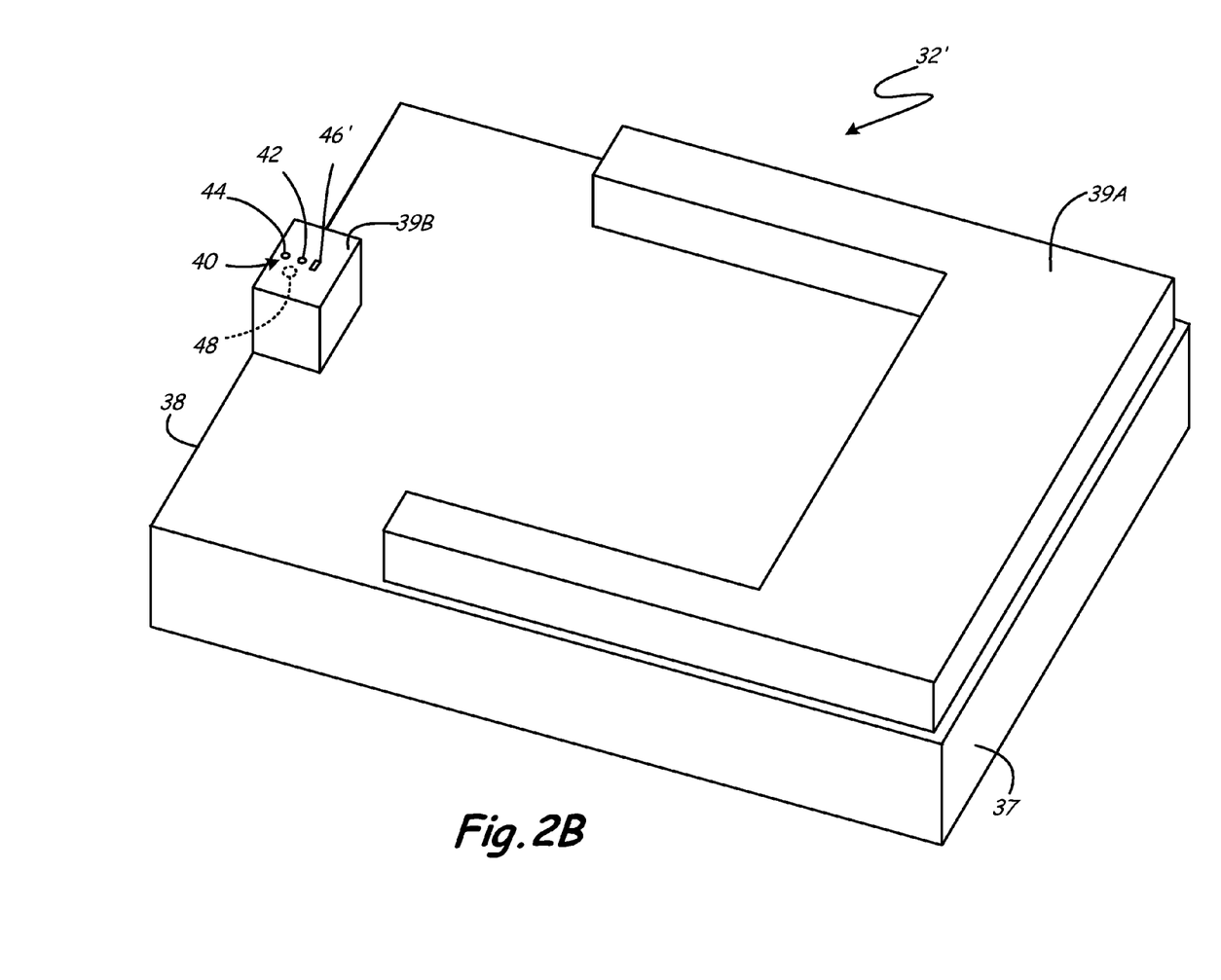
FIG. 2B is a perspective view of another embodiment of the slider and contact finger of FIG. 2A.

FIG. 2B is a perspective view of a second embodiment of slider 32'. Slider 32' in FIG. 2B is similar to slider 32 in FIG. 2A except for position of contact finger 46'. Contact finger 46' is positioned near transducing head 40, between reader 42 and leading edge 37.

Figure 2C:
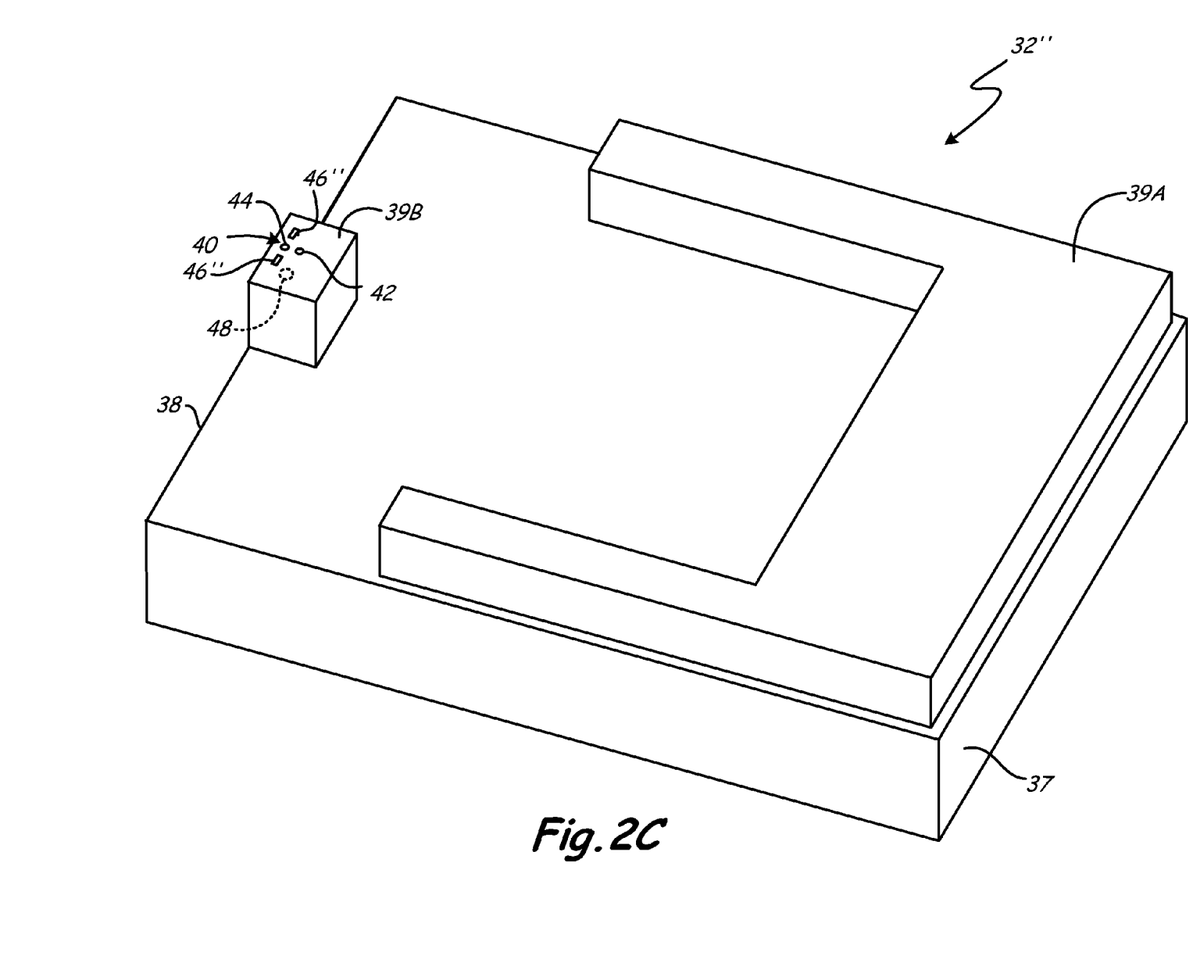
FIG. 2C is a perspective view of yet another embodiment of the slider and contact finger of FIG. 2A.

FIG. 2C is a perspective view of a third embodiment of slider 32". Slider 32" in FIG. 2C is similar to slider 32 in FIG. 2A except for position of first and second contact fingers 46", which are on opposite sides of writer 44. Contact fingers 46" and writer 44 are in a substantially straight line, substantially parallel with trailing edge 38.

Figure 3:
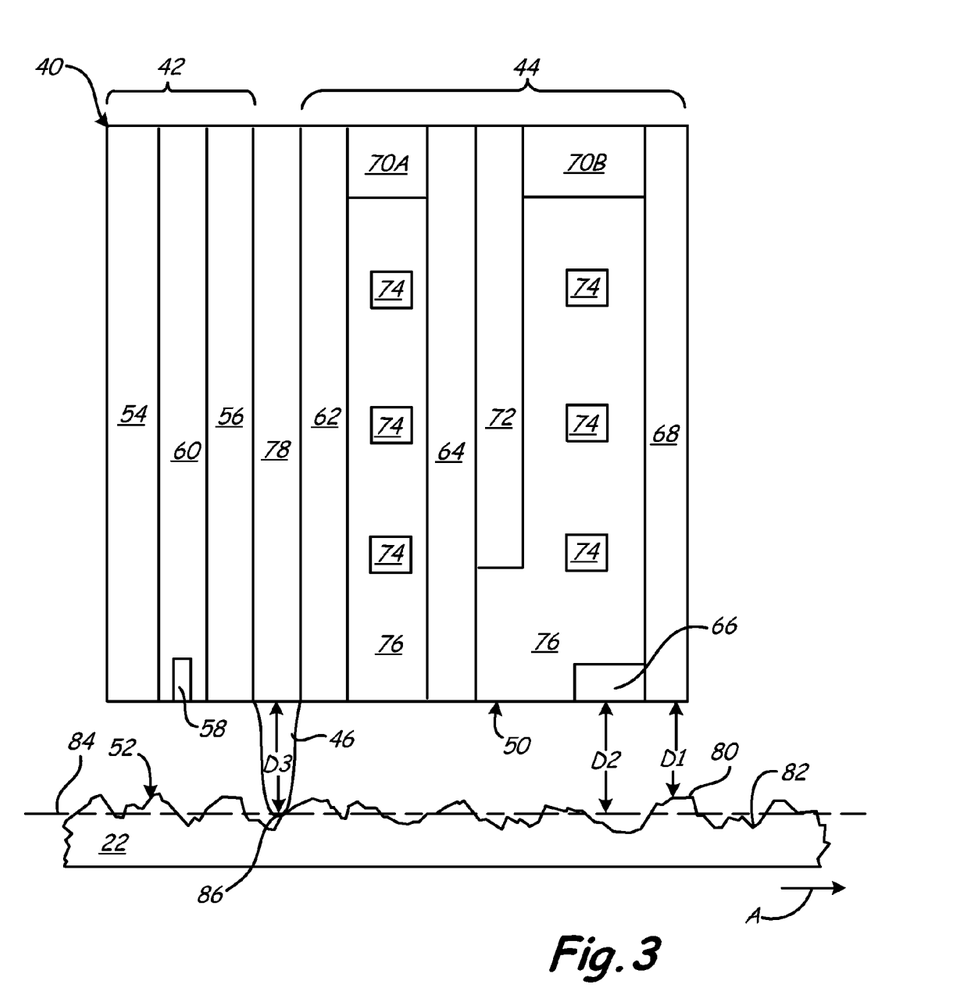
FIG. 3 is cross-sectional view of a transducing head taken along line 3-3 of FIG. 2A.

FIG. 3 is cross-sectional view of disc 22 and transducing head 40 taken along line 3-3 of FIG. 2A. FIG. 3 illustrates transducing head 40 and its location relative to disc 22. Disc confronting surface 50 of transducing head 40 faces disc surface 52 of disc 22. Disc 22 moves in a direction relative to transducing head 40 as indicated by arrow A.

Reader 42 of transducing head 40 includes bottom read shield 54, top read shield 56, and reader element 58, which is spaced from read shields 54 and 56 by read gap material 60. In merged configurations, top read shield 56 also serves as first return pole 62 for writer 44. Reader element 58 may be a magnetoresistive (MR) element formed of a material that changes resistance in response to an external field.

Writer 44 of transducing head 40 includes first return pole 62, main pole 64, multi-component write shield 66, and, in some embodiments, second (trailing) return pole 68. Typical embodiments of writer 44 also include back vias 70A and 70B, yoke 72, and one or more sets of coils 74 with insulating layers 76. Writer 44 is spaced from reader 42 by nonmagnetic layer 78.

Contact finger 46 extends from nonmagnetic layer 78 toward disc surface 52 of disc 22. Disc surface 52 is a rough surface with peaks 80 and valleys 82. An average height of peaks 80 and valleys 82 is represented by surface mean line 84. The distance between the tallest peak 80 and lowest valley 82 can be about 1 to 2 nanometers (nm). Disc confronting surface 50 can also be a rough surface with peaks and valley, but is shown as a smooth surface in FIG. 3 for simplicity. The tallest peak on disc confronting surface 50 will be considered to extend from second return pole 68, again for simplicity. Clearance D1 of transducing head 40 is measured between the tallest peak on disc confronting surface 50 and tallest peak 80 of disc surface 52. Clearance D1 is the smallest distance between transducing head 40 and disc 22 as disc 22 rotates. Fly height D2 of transducing head 40 is measured between disc confronting surface 50 and surface mean line 84. Fly height D2 is the mean distance between transducing head 40 and disc surface 52 as disc 22 rotates. Contact finger 46 has contact surface 86 for contacting disc surface 52. Finger height D3 is the distance by which contact finger 46 extends from slider 32, as measured from disc confronting surface 50 to contact surface 86.

Transducing head 40 benefits from being very close to disc 22 when reading and writing. As transducing head 40 is positioned closer to disc 22, transducing head 40 is able to read and write to narrower data tracks 36 (shown in FIG. 1). This allows HDD system 20 to have a greater storage capacity. If, however, transducing head 40 is in direct contact with disc 22, transducing head 40 can be damaged. Contact finger 46 allows for close spacing, while protecting from actual contact, between transducing head 40 and disc 22.

In one embodiment, clearance D1 can be between about 1 nm to about 2 nm. Fly height D2 can be between about 2 nm to about 4 nm. If clearance D1 were to be greater than 2 nm or fly height D2 were to be greater than 4 nm, transducing head 40 could fail to read and write sufficiently small data tracks 36 (shown in FIG. 1).

Contact finger 46 is in substantially continuous contact with disc surface 52 as disc 22 spins. Contact finger 46 includes a compressible material so that it can be compressed by peaks 80 and expand into valleys 82 as it slides across disc surface 52. Disc surface 52 can also compress during contact. When not compressed, contact finger 46 can have finger height D3 of between about 2 nanometers (nm) and about 20 nm. If the uncompressed finger height D3 were to be less than 2 nm, it may not adequately protect transducing head 40 from contacting peaks 80 of disc 22. If the uncompressed finger height D3 were to be greater than about 20 nm, then an undesirably large force could be required to compress contact finger 46 in order to get transducing head 40 suitably close to disc surface 52. An undesirably large force can cause contact finger 46 to press into and wear away disc surface 52 by an undesirable amount. In a preferred embodiment, uncompressed finger height D3 is between about 2 nm and 10 nm to further reduce force required to adequately compress contact finger 46. In one example, contact finger 46 can have an uncompressed height D3 of about 10 nm and be compressed such that transducing head 40 has fly height D2 of about 2 nm. Contact finger 46 need not, however, compress the full 8 nm itself. Instead, contact finger 46 can compress by about 4 nm and disc 22 can also compress by about 4 nm to achieve the 2 nm fly height D2.

Transducing head 40 also benefits from being positioned proximate to contact finger 46. In a preferred embodiment, contact finger 46 is positioned within about 100 microns (micrometers, μm) of transducing head 40. If contact finger 46 were positioned more than about 100 microns away from transducing head 40, distance between transducing head 40 and disc 22 may not be adequately controlled. For example, during pitch and roll of slider 32, contact finger 46 can remain in substantially continuous contact with disc 22, acting as a pivot point. If transducing head 40 is positioned more than 100 microns away from the pivot point, it can move undesirably close or far from disc 22 during the pitch and roll. In a more preferred embodiment, contact finger 46 can be within about 20 microns of transducing head 40. In a most preferred embodiment, contact finger 46 can be within about 5 microns of transducing head 40.

In the embodiment illustrated in FIGS. 2A and 3, contact finger 46 is positioned right at transducing head 40, on nonmagnetic layer 78 between reader 42 and writer 44. Such positioning allows for transducing head 40 to have essentially the same position as the contact point, and consequentially, the pivot point. In other embodiments, contact finger 46 can be positioned on other components of transducer 40, such as bottom read shield 54, top read shield 56, or insulating layers 76. In the embodiment illustrated in FIG. 2B, contact finger 46' is positioned between reader 42 and leading edge 37. In certain sliders, a portion of air bearing surface 39B in front of transducing head 40 is positioned nearer disc 22 than is transducing head 40. Such positioning can allow contact finger 46' to extend from the portion of air bearing surface 39B that is nearest to disc 22. In the embodiment illustrated in FIG. 2C, the two portions of contact finger 46" are on opposite sides of writer 44 in a substantially straight line parallel with trailing edge 38. Such arrangement allows for contact finger 46" to provide some roll stability to slider 32 in addition to its other functions.

Operation of contact finger 46 further benefits from contact surface 86 having an area of between about 2 square microns and about 20 square microns. If contact surface 86 were to be greater than about 20 square microns, a number of problems could result. First, contact finger 46 could become large enough to undesirably affect air flow across air bearing surfaces 39A and 39B. Second, contact finger 46 could become so large that an undesirably large compression force would be required to compress contact finger 46 in order to get transducing head 40 suitably close to disc surface 52. Third, contact finger 46 could become large enough that it can no longer ensure a controllable height at a particular point. For example, during pitch and roll of slider 32, contact finger 46 can act as a single pivot point by virtue of having a sufficiently small contact surface 86, thus ensuring a predictable distance between transducing head 40 and disc surface 52 at that pivot point. If contact surface 86 were to be too large, slider 32 would pivot at edges of contact surface 86, thus creating multiple pivot points. Distance between transducing head 40 and disc 22 could depend on whether slider 32 rolls to one direction or another.

If, on the other had, contact surface 86 were to be less than about 2 square microns, other problems could occur. First, contact finger 46 could become so small that it fails to provide a compressed force adequate to space transducing head 40 from disc 22. Second, contact finger 46 could become so small that it wears away undesirably quickly as it slides across disc surface 52. Contact finger 46 can be a sacrificial contact finger, designed to wear away over time. Designing contact finger 46 to wear away allows for reduced wear of disc surface 52. Therefore, contact finger 46 should have a large enough area on contact surface 86 so that contact finger 46 does not wear away by an undesirable amount before the end of the useful life of HDD system 20. In a preferred embodiment, contact surface 86 can have an area of between about 2 square microns and about 5 square microns to further improve air flow, compression force, and stability characteristics.

Contact finger 46 can include one or more of a variety of compressible materials, such as cobalt alloys, nickel-iron alloys, and alumina. A layer of diamond-like-carbon can be applied on contact finger 46. Contact finger 46 can be made through a milling process, a lapping process, or both.

Figure 4:
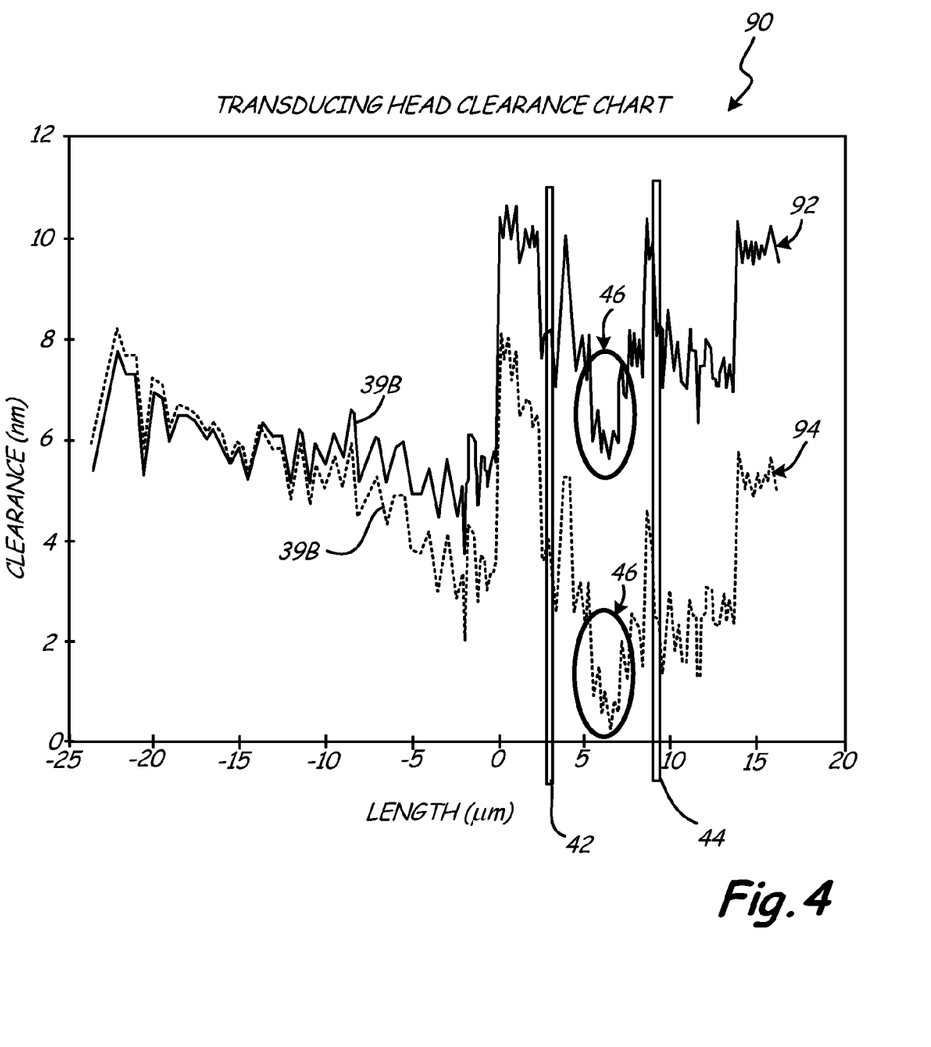
FIG. 4 is a transducing head clearance chart.

FIG. 4 illustrates transducing head clearance chart 90. Transducing head clearance chart 90 plots clearance values of a portion of air bearing surface 39B, reader 42 (position marked with a vertical line), writer 44 (position marked with another vertical line), and contact finger 46 (position circled) in the embodiment illustrated in FIGS. 2A and 3. Because clearance chart 90 magnifies extremely small features, surfaces represented by clearance lines 92 and 94 appear very jagged. Reader 42 is positioned approximately 3 microns from a zero reference and writer 44 is positioned approximately 9 microns from the zero reference. Contact finger 46 extends from about 5 microns to about 7 microns from the zero reference.

Clearance line 92 illustrates clearance values when heater 48 is not activated, transducing head 40 is not reading or writing, and contact finger 46 is spaced from disc 22 (shown in FIG. 3). Clearance line 92 shows contact finger 46 having a clearance of about 6 nm and shows reader 42 and writer 44 having clearance of about 8 nm.

Clearance line 94 illustrates clearance values when heater 48 is activated, when transducing head 40 is about to begin reading and/or writing, and when contact finger 46 is about to contact disc 22 (shown in FIG. 3). Heater 48 has heated and expanded air bearing surface 39B, reader 42, writer 44, and contact finger 46 toward disc 22 (shown in FIG. 3). Clearance line 94 shows contact finger 46 having a clearance of almost 0 nm and shows reader 42 and writer 44 still having a clearance of about 3 nm. Prior to transducing head 40 performing a transducing operation, heater 48 will cause air bearing surface 39B, reader 42, writer 44, and contact finger 46 to expand even further, until contact finger 46 is compressed against disc 22 with a clearance of about zero. In various embodiments, reader 42 and writer 44 can extend from air bearing surface 39B by various amounts, such as positively extending or negatively extending (also called recessed). In each of these embodiments, reader 42 and writer 44 extend from air bearing surface 39B by a distance less than that of contact finger 46.

It will be recognized that the present invention provides numerous benefits and advantages. For example, contact finger 46 improves air bearing stability of slider 32 when operating at very low clearances. The low clearance gives greater reading and writing density, and the stability gives a decrease in error rate. Additionally, contact finger 46 protects transducing head 40 from crashing into disc 22 and becoming damaged. All of this is done with relatively little wear occurring to disc surface 52.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, slider 32 and air bearing surfaces 39A and 39B can be shaped differently from those illustrated, so long as contact finger 46 is positioned for contact with disc 22.

The invention claimed is:

1. A method for operating a data storage device, the method comprising:
   flying a slider carrying a transducing head over a storage medium with a contact finger extending from the slider, having a contact surface area of between about 2 square microns to about 20 square microns, and positioned on the slider proximate the transducing head; the slider further supporting a heater;
   causing the contact finger to extend from the slider by way of the heater;
   pressing the contact finger against the storage medium so as to compress the contact finger and to provide substantially continuous contact between the contact finger and the storage medium; and
   performing a transducing operation with the transducing head spaced apart from the storage medium while the contact finger is compressed in substantially continuous contact with the storage medium.

2. The method of claim 1, wherein the transducing operation comprises:
   writing data to the storage medium with the transducing head while the contact finger is contacting the storage medium.

3. The method of claim 1, wherein the transducing operation comprises:
   reading data from the storage medium with the transducing head while the contact finger is contacting the storage medium.

4. The method of claim 1, and further comprising:
   stabilizing slider modulation with the contact finger in contact with the storage medium.

5. An apparatus comprising:
   a storage medium; and
   a slider including:
      a slider body having an air bearing surface facing the storage medium;
      a transducing head supported by the slider body and positioned to be spaced from the storage medium when the transducing head is performing a transducing operation;
      a heater supported by the slider body; and
      a compressible contact finger extending from the slider body proximate to the transducing head, having a contact surface area of between about 2 square microns to about 20 square microns, and compressed against the storage medium in substantially continuous contact with the storage medium when the transducing head is performing a transducing operation;

wherein the heater causes the compressible contact finger and a portion of the air bearing surface to extend from the slider body.

6. The apparatus of claim 5, wherein transducing head is positioned within about 100 microns of the compressible contact finger.

7. The apparatus of claim 5, wherein the compressible contact finger extends from the air bearing surface by about 2 nanometers to about 20 nanometers when not compressed.

8. The apparatus of claim 5, wherein the transducing head has a clearance between about 1 nanometers and about 2 nanometers when performing the transducing operation.

9. The apparatus of claim 5, wherein the transducing head has a fly height between about 2 nanometer and about 4 nanometers when performing the transducing operation.

10. The apparatus of claim 5, and further comprising:
an actuator connected to the slider for compressing the compressible finger against the storage medium.

11. The apparatus of claim 5, wherein the compressible contact finger is positioned on a component of the transducing head.

12. A slider comprising:
a slider body having an air bearing surface;
a first contact finger extending from the slider body and having a contact surface area of between about 2 square microns to about 20 square microns;
a heater supported by the slider body for causing the first contact finger and a portion of the air bearing surface to extend from the slider body; and
a transducing head supported by the slider body proximate the first contact finger and extending from the air bearing surface by a distance less than that of the first contact finger.

13. The slider of claim 12, wherein the slider body includes a leading edge and a trailing edge, and wherein the first contact finger and the transducing head are positioned nearer the trailing edge than the leading edge.

14. The slider of claim 12, wherein the transducing head includes a reader and a writer, and wherein the first contact finger is positioned between the reader and the writer.

15. The slider of claim 12, wherein the transducing head includes a writer, the slider further comprising:
a second contact finger supported by the slider body and extending from the air bearing surface by about 2 nanometers to about 20 nanometers, wherein the writer is positioned between the first contact finger and the second contact finger.

16. The slider of claim 12, wherein the transducing head includes a reader, the slider further comprising:
a leading edge and a trailing edge opposite the leading edge, wherein the first contact finger is positioned between the reader and the leading edge.

17. The slider of claim 12, wherein the first contact finger has a contact surface area of between about 2 square microns to about 5 square microns.

18. The slider of claim 12, wherein transducing head is positioned within about 100 microns of the first contact finger.

19. The slider of claim 12, wherein the first contact finger extends from the air bearing surface by about 2 nanometers to about 20 nanometers.

20. The apparatus of claim 5, wherein the transducing head includes a reader and a writer, and wherein the contact finger is positioned between the reader and the writer.

* * * * *